United States Patent [19]
Kiuchi et al.

[11] Patent Number: 4,809,206
[45] Date of Patent: Feb. 28, 1989

[54] INFORMATION PROCESSING APPARATUS

[75] Inventors: Atsushi Kiuchi, Kunitachi; Kenji Kaneko, Sagamihara; Jun Ishida; Tetsuya Nakagawa, both of Koganei; Yoshimune Hagiwara, Hachioji; Hirotada Ueda, Kokubunji, all of Japan

[73] Assignees: Hitachi Ltd.; Hitachi VLSI Eng. Corp., Tokyo, Japan

[21] Appl. No.: 87,346

[22] Filed: Aug. 20, 1987

[30] Foreign Application Priority Data

Aug. 29, 1986 [JP] Japan ................... 61-202996

[51] Int. Cl.$^4$ ............................... G06F 7/38
[52] U.S. Cl. ............................... 364/724.01
[58] Field of Search ................ 364/572, 724, 770

[56] References Cited
U.S. PATENT DOCUMENTS 4,337,518 6/1982 Ohnishi et al. ................ 364/724
4,590,583 5/1986 Miller ........................... 364/724

Primary Examiner—Eugene R. LaRoche
Assistant Examiner—David Mis
Attorney, Agent, or Firm—Antonelli, Terry & Wands

[57] ABSTRACT

This invention relates to an information processing apparatus such as a digital signal processor and is applied particularly suitably to a digital filter.

A plurality of data from initial value data till final value data relating to filtering coefficients of a digital filter are stored in a data memory, and are sequentially read out by an increment operation of an address arithmetic unit.

A data arithmetic unit executes sequentially product and/or sum operations of a plurality of data that are sequentially read out and digital input signals that are sequentially inputted, to perform digital signal processing.

The information processing apparatus is equipped particularly with means, which when an access address starts from an initial value, exceeds a final value and reaches a return address due to the increment operation, returns automatically the access address to the initial value. Therefore, a plurality of data stored in the data memory can be utilized repeatedly.

Contrivances are made in order to set the number of a plurality of data that are stored in the data memory for repetition of use, to an arbitrary value.

7 Claims, 8 Drawing Sheets

FIG. 4

| | |
|---|---|
| 1 | REGISTER 1 = 0 |
| 2 | FOR LOOP1 = 1 TO m |
| 3 | LOAD REGISTER 1 → REGISTER 3 |
| 4 | OUTPUT REGISTER 3 |
| 5 | FOR LOOP2 = 1 TO n |
| 6 | INC REGISTER 3 |
| 7 | OUTPUT REGISTER 3 |
| 8 | NEXT LOOP 2 |
| 9 | NEXT LOOP 1 |
| 10 | |

FIG. 5

| | |
|---|---|
| 1 | REGISTER 1 = a |
| 2 | REGISTER 2 = a + n + 1 |
| 3 | LOAD REGISTER 1 → REGISTER 3 |
| 4 | OUTPUT REGISTER 3 |
| 5 | FOR LOOP1 = 1 TO m×(n+1)−1 |
| 6 | MODINC. REGISTER 3 |
| 7 | OUTPUT REGISTER 3 |
| 8 | NEXT LOOP 1 |

INFORMATION PROCESSING APPARATUS

BACKGROUND OF THE INVENTION

This invention relates generally to an information processing apparatus such as a digital signal processor and more particularly to a technique which is effective for improving the speed of address calculation by reducing the number of program steps.

Apparatuses for quantizing an audio signal or a video signal and making a digital arithmetic operation or conversion operation of the digital signal obtained by analog-to-digital conversion of the quantized signal are generally referred to as "digital signal processors".

The operations of the digital signal processors include filtering, equalization, reduction of noise and echo, modulation, Fourier transform, extraction of characteristic parameters of the signal, signal prediction, emphasis of the video signal, and so forth.

The output signal from the digital signal processor is returned to an analog signal through digital-analog conversion and a final output signal is obtained through a low-pass filter.

In the 1970s, the progress in LSI technique proposed exclusive-use LSIs in which adders, multipliers, unit delay elements and the like as the basic constituent elements of digital arithmetic processing were laid out along the flow of signal processing. Since this exclusive-use LSI can minimize a circuit scale, it would be most economical if it could be mass-produced.

In the 1980s, on the other hand, digital signal processor LSIs of a stored program control type were proposed. Since this LSI programs the algorithm of signal processing by micro-instruction and reads out and executes this instruction from a memory, it has a multi-use property or versatility in that any signal processing can be accomplished in accordance with a program.

The present invention relates to a technique which is suitable for the multi-use digital signal processor LSI of the kind described above.

The digital signal processor LSI examined by the present inventors before filing of the present Application consists of a data memory 11 for storing data, an instruction memory 12 for storing instruction codes, an address arithmetic unit 13 for calculating the access address for the data memory 11, a program counter 14 for designating the access address of the instruction memory 12, a data arithmetic unit 15 for calculating the data that is read out from the data memory 11, a decoder 16 for decoding the instruction read out from the instruction memory 12, and the like, as shown in FIG. 9 of the accompanying drawings. In LSI, these circuits 11 to 16 are built in one semiconductor chip.

First of all, one instruction is read out from the address of the instruction memory 12 which is designated by the program counter 14 and is decoded by the decoder 16 to determine the address which is to be read out next. The address is sent to the program counter 14 and the address for reading the operand data to be calculated is calculated by the address arithmetic unit 13. The operand data is read out by making access to the data memory 11 by the address thus calculated, and is then inputted to the data arithmetic unit 15 for calculation processing.

Hereinafter, the address arithmetic unit 13 shown in FIG. 9 will be described in further detail. The address arithmetic unit disposed in the digital signal processor examined before the filing of the present Application consists of an arithmetic unit 104 and several registers 102, 107 as shown in FIG. 2. Whenever it receives the instruction, the address arithmetic unit 13 performs predetermined calculation and outputs the result of calculation as the address. Such a construction is the same as that of the data arithmetic unit 15 shown in FIG. 9. This construction has high versatility and can be said suitable for data arithmetic units for performing various calculations. However, the most characterizing feature of address calculation lies in its algorithm and its major proportion mostly consists of repetition of the same calculation.

Where the data memory stores the coefficients of the digital filter, for example, access is made sequentially and repeatedly to a certain predetermined address range of the memory for filtering and the coefficient data of the filter are sent to the data arithmetic unit at fixed periods. The calculation made by the address arithmetic unit 104 at this time is only repetition of loading of the initial address and increment (+1) calculation.

FIG. 10(b) shows an example of the weigh function obtained by converting time- and space-wise the predetermined frequency characteristics of the digital filter. In the diagram, the abscissa represents the time and the ordinate does a signal transmission amount. If the time width is secured infinitely, the filter characteristics will become completely ideal but this is impossible in practice. It is therefore one of the most important design items of digital filters to set the time width to a definite value $n+1$ (hereinafter called the "tap number") within a range in which an error from the ideal value is permissible.

Therefore, the weight function waveform such as shown in FIG. 10(b) is cut in a strip shape and stored in the addresses 0 to n of the memory such as shown in FIG. 10(a) as the filtering coefficients. The digital coefficients thus stored are sequentially read out from the memory and sequentially subjected to the product and-/or sum operation by the data arithmetic unit with the digital input signals that are sequentially inputted after quantization and analog-digital conversion. Digital signal processing is carried out in this manner.

The number of repetition m of the $n+1$ step product and/or sum operation necessary for signal processing of the digital signal processor described above is defined as the "number of times of filtering or filtering number".

FIG. 3 shows the operation flowchart of the address arithmetic unit shown in FIG. 2. Here, the number of times of repetition of operations is loop 1 (=m), the tap number (the number of each time point cut out in the stripe shape) is loop 2 (=n) and reduction count is made sequentially from these values.

First of all, the initial value 0 is set to the register 102 (step 31) and then the number of times of operations in filtering is set (loop 1=m; step 32). Next, the initial value 0 is passed from the register 102 to the arithmetic unit 104 and loaded to the register 107 (step 33) and its value is set as the initial address output (step 34). Next, the number obtained by subtracting 1 from the tap number of the filter is set as the second loop. In other words, since one tap has been complete at the time when the initial address value is outputted, the remaining number n is set (step 35). The increment calculation instruction and the address output are executed inside this second loop. In other words, the initial address output 0 and the value 1 set to the register 102 are added by the arithmetic unit 104 and the result (0+1) is set to the register 107 and outputted (steps 36, 37). When the second loop is complete (or when the value of the loop 2 is subtracted and reaches 0), the flow returns again to the first loop and the procedures from loading of the initial value address are repeated (step 38). When the result does not turn out 0 even when the value of the loop 2 is subtracted by 1, the procedure is repeated, the procedure returns to the step 33 and the initial value address is loaded (steps 40, 41).

FIG. 4 shows an example of the program used when executing the flowchart shown in FIG. 3 by the construction shown in FIG. 2. In other words, the program includes the instruction of setting the initial value address 0 to the register 1 (step 1), the instruction of setting the loop 1 to 1 - m (step 2), the instruction of loading the content of the register 1 to the register 3 (step 3), the instruction of outputting the content of the register 3 (step 4), the instruction of setting the loop 2 to 1 - n (step 5), the instruction of incrementing the register 3 (step 6), the instruction of outputting the register 3 (step 7), the instruction of executing the next loop 2 (step 8), the instruction of executing the next loop 1 (step 9), and the like.

In accordance with the construction shown in FIG. 2, the loop is double as shown in FIG. 4. In other words, the inner loop number setting instruction (the instruction of step 5 in FIG. 4) must be executed whenever one filtering is complete and for this reason, a processing speed drops.

On the other hand, address computation units to support modulo addressing were proposed in "On the IC Architecture and Design of a 2 μm CMOS 8 MIPS Digital Signal Processor with Parallel Processing Capability: The PCB 5010/5011" (PROCEEDINGS ICASSP 86, Vol. 1, p.p. 385-388) at Seccison 8-1 of Tokyo Conference of 1968 ICASSP.

As the address value starts from the initial value address (0 address) of the output of the address arithmetic unit, the access address increases sequentially due to increment (+1), then arrives at the final value address and exceeds this final value address, modulo addressing detects the excess of the address value beyond the final value address and automatically returns the address value to the initial value address (0 address) on the basis of this detection result.

In accordance with this method, therefore, the loop can be reduced to a single loop but the tap number of the filter must be limited to the power of 2, and the method involves the problem in that its versatility is extremely low.

SUMMARY OF THE INVENTION

It is therefore an object of the present invention to provide an information processing apparatus which eliminates the problems of the prior art technique described above, excludes excessive loop instruction necessary for an address arithmetic unit to reduce the step number of a program, is free from the problem that the tap number (that is, the number of stored data to be read out repeatedly) is not limited to the power of two (2) and can improve a signal processing speed.

In the information processing apparatuses disclosed herein, the following will illustrate a typical example.

The information processing apparatus in accordance with a preferred embodiment of the present invention comprises an instruction memory for storing instruction codes, a decoder for decoding the instruction read out from the instruction memory, a data memory for storing data, an address arithmetic unit for calculating the access addresses of the data memory in response to the output of the decoder and a data arithmetic unit for receiving the data read out from the data memory in accordance with the access address, and after an initial value address is set to an arbitrary definite value exclusive of zero (0), the address arithmetic unit sequentially increments the initial value to generate a final value address. The apparatus of the invention includes especially means, which when the access address exceeds the final value address as a result of subsequent increment, returns automatically the access address to the initial value set to an arbitrary definite value exclusive of zero (0).

When the access address is constituted by a binary signal having a plurality of bits, the final value address becomes a binary signal whose all bits from LSB (Less Significant Bit) to MSB (Most Significant Bit) are odd-numbered or "1". When increment is made beyond this final value address, the conventional modulo addressing system returns the access address to the initial value address whose bits from LSB to MSB are all "0" (that is, the 0 address); hence, the tap number is limited to the power of 2. In the embodiment of the invention, on the other hand, the initial value address is set to an arbitrary definite value exclusive of zero and when increment is made beyond the final value address, the access address is returned to this initial value address so that an arbitrary tap number can be obtained.

BRIEF DESCRIPTION OF THE DRAWINGS

FIG. 4 shows an example of the program for executing the operation shown in FIG. 3 by use of the address arithmetic unit shown in FIG. 2;

FIG. 5 shows an example of the program for executing the operation of FIG. 3 by use of the address arithmetic unit shown in FIG. 1(a);

DESCRIPTION OF THE PREFERRED EMBODIMENTS

Hereinafter, some preferred embodiments of the present invention will be described in detail with reference to the accompanying drawings.

Figure 9:
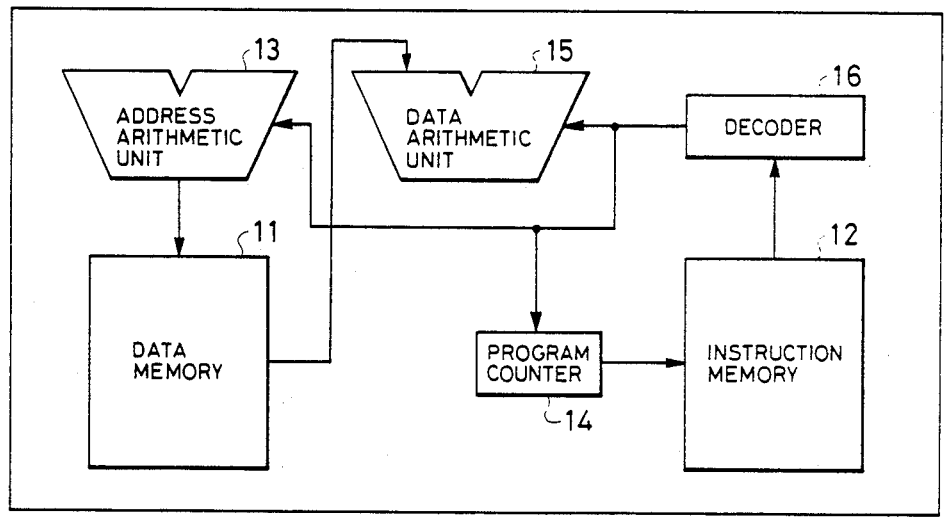
FIG. 9 is an overall structural view of a digital signal processor.
Figure 10A:
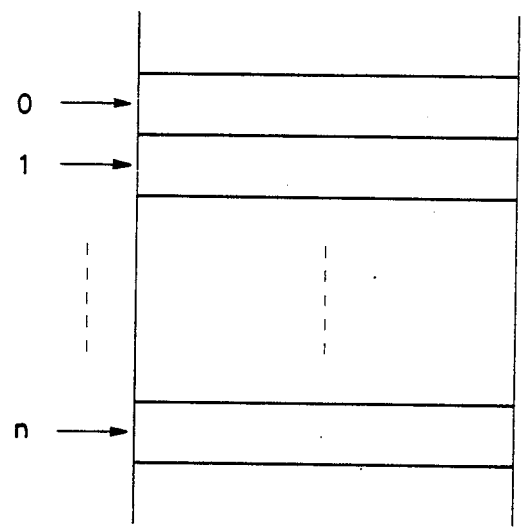
FIG. 10(a) is a structural view of the data memory.
Figure 10B:
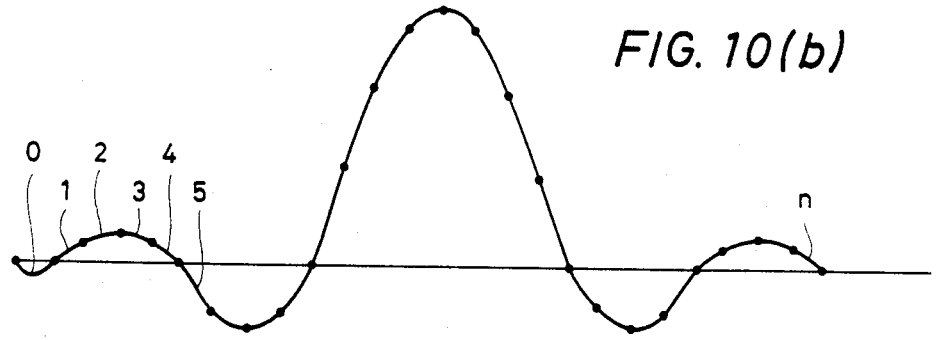
FIG. 10(b) shows an example of weigh functions of a digital filter.

FIG. 9 shows the overall structure of the digital signal processor in accordance with one embodiment of the present invention. Since this diagram has already been described, description of overlapped portions will be omitted.

The instruction memory 12 stores micro-instruction of digital signal processing and the data memory 11 stores filtering coefficients of the digital filter. The data arithmetic unit 15 performs sequentially the product and/or sum operation of the filtering coefficients and the digital input signal.

Figure 1A:
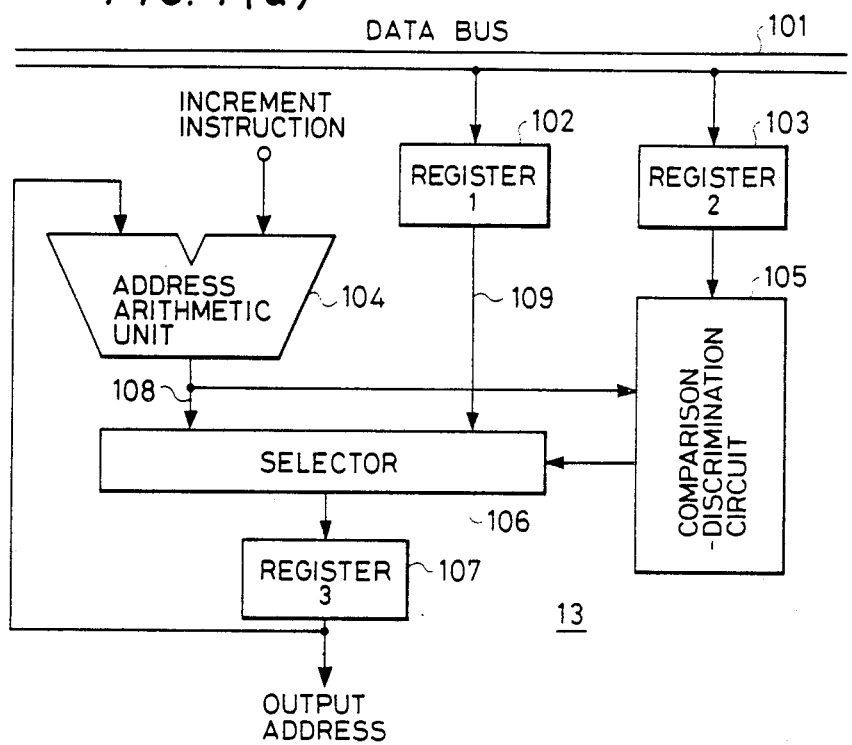
FIG. 1(a) is a block diagram of an address arithmetic unit of a digital signal processor in accordance with one embodiment of the present invention.

FIG. 1(a) is a block diagram useful for explaining in detail the address arithmetic unit 13 of the digital signal processor shown in FIG. 9.

Figure 1B:
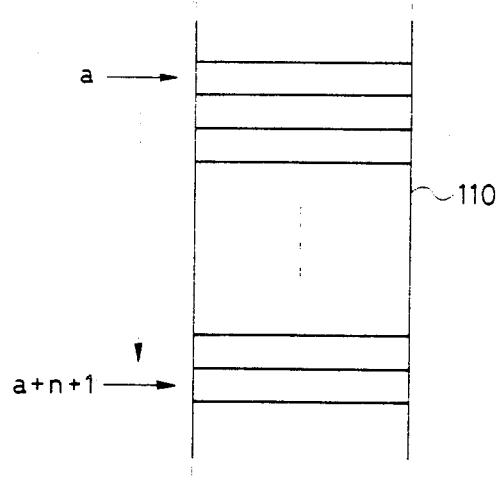
FIG. 1(b) is a structural view of a data memory of the processor.
Figure 2:
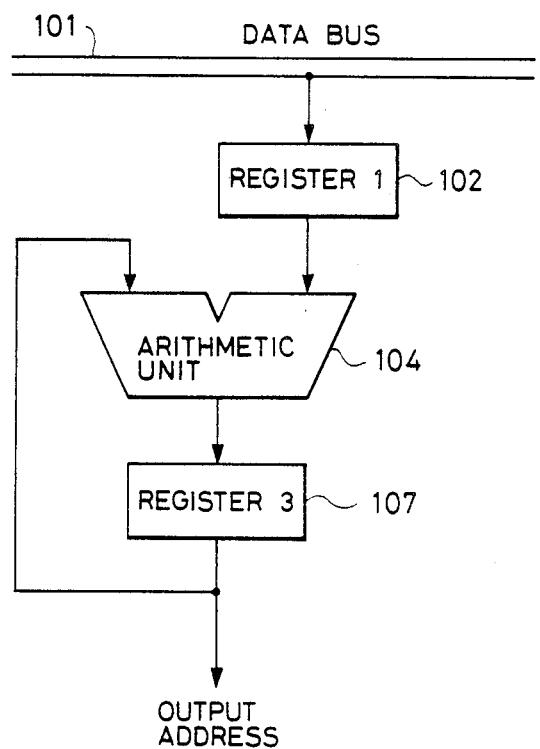
FIG. 2 is a block diagram of the address arithmetic unit examined by the present inventors before filing of the present Application.

In FIG. 1(a), reference numeral 101 represents a data bus to which a value to be set to each register is sent; 102 is a register for holding the initial value address; 103 is a register for holding a return address (that is, the address obtained by adding +1 to the final value address); 104 is an address arithmetic unit having an increment (+1) or decrement (−1) function, 105 is a comparison-discrimination circuit which compares the output 108 of the arithmetic unit 104 with the content of the register 103, judges whether or not they are in agreement with each other and controls a selector 106, which selects either one of the output 108 and the output 109 of the register 102, on the basis of result of judgement; and 107 is a register for holding the output address of the selector 106 and inputting its output to the arithmetic unit 104. In FIG. 1(b), reference numeral 110 represents the data memory, symbol a is the initial value address and symbol a+n+1 is the return address when the tap number is n+1.

Next, an example of the operation of the address arithmetic unit shown in FIG. 1(b) will be described with reference to FIG. 3. First of all, the initial value address and the return address are set to the registers 102 and 103, respectively (step 31).

After a necessary loop number is set by a separate circuit, the procedure enters the loop (step 32). First of all, the content of the register 102 is loaded to the register 107 through the selector 106 (step 33). At this time the initial value address is outputted (step 34). Here, an increase/decrease instruction which is effective only within the range of the set initial value address and the final value address (i.e. a~(a+n)) is disposed afresh. This instruction will be hereinafter called "MODINC, MODDEC instruction" in contrast with the ordinary increment (+1) and decrement (−1) instructions. These newly disposed instructions execute processings which output automatically the initial value as the result of calculation when the result of calculation is in agreement with the return address (steps 33, 34, 39). If the result of calculation does not reach the return address, the same processing as the ordinary increment and decrement instructions is as such carried out (steps 36, 37, 39). If it reaches the filtering number set separately, the procedure is stopped (steps 40, 41).

Figure 3:
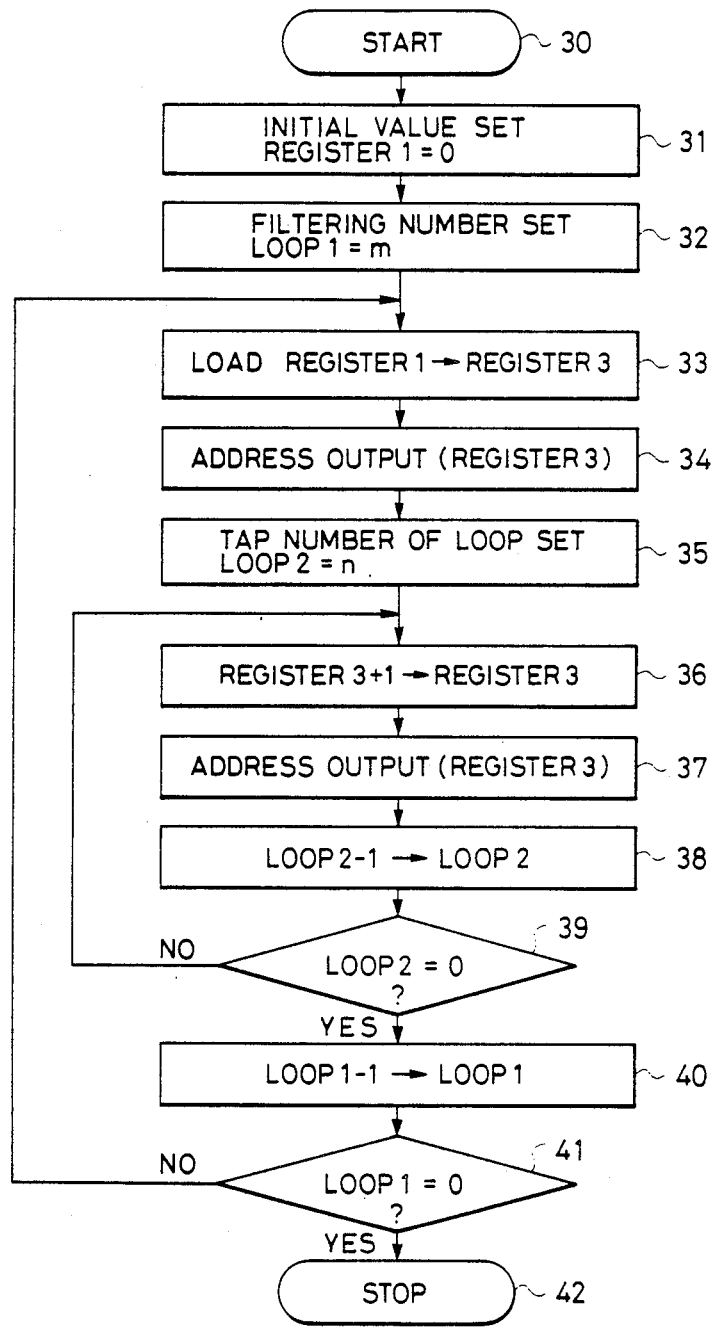
FIG. 3 is an operation flowchart for executing filtering by the digital signal processor by use of the address arithmetic unit shown in FIGS. 1(a) or 2.

In the manner described above, the operation in the construction shown in FIG. 1 executes the same operation as that of step 39 shown in FIG. 3 by use of the hardwares (register 103, comparison-discrimination circuit 105 and selector 106). Thus, the return processing to the initial value, that has been accomplished by double loop control in the prior art technique is accomplished at a high speed by use of the hardwares and the instruction that is disposed afresh.

On the other hand, the values of the initial value address and return address stored respectively in the registers 102 and 103 can be set to arbitrary values. Therefore, the tap number n+1 is not limited to the power of 2 but can be set to an arbitrary value.

FIG. 5 shows an example of the program obtained by the circuit construction and instruction shown in FIG. 1. This drawing illustrates repetition of those instructions which include an instruction of setting the initial value address a to the register 1 (step 1), an instruction of setting the return address (a+n+1) to the register 2 (step 2), an instruction of transferring the content of the register 1 to the register 3 (step 3), an instruction of outputting the content of the register 3 (step 4), an instruction of setting the loop 1 from 1 to (mx(n+1)−1) (step 5), an MODINC instruction of incrementing the value of the register 3 (step 6), an instruction of outputting the content of the register 3 (step 7) and an instruction of entering the next round of the loop 1 (step 8).

As shown in FIG. 5, the step number is reduced on the program, too, in this embodiment and since the loop is single, high speed calculation of address calculation becomes possible.

Figure 6A:
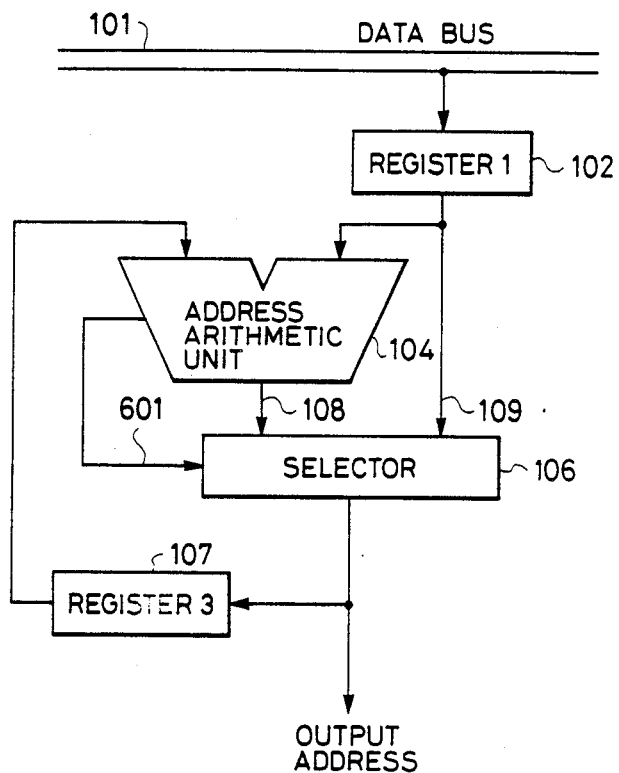
FIG. 6(a) is a block diagram of the address arithmetic unit in the second embodiment of the present invention.

FIG. 6 shows the structure of the address arithmetic unit showing the second embodiment of the present invention and the address disposition of the data memory. In FIG. 6(a), reference numeral 601 represents an overflow carry signal of the arithmetic unit 104. This overflow carry signal is a binary signal which is higher by one bit than MSB of the access address. Therefore, when the access address reaches the return address beyond the final value address due to increment, this overflow carry signal changes from "0" to "1". In other words, the final value address in this case becomes the signal whose bits from LSB to MSB of the access addresses are all "1". To set the tap number n+1 to an arbitrary value which is not limited to the power of 2, the initial value address is set to an arbitrary definite value exclusive of zero (that is, a value at least one of the bits from LSB to MSB of which is "1"), and when the access address reaches the return address beyond the final value address due to increment, the access address returns automatically to the initial value (that is, an arbitrary definite value other than zero).

Therefore, in the embodiment shown in FIG. 6(a), the functions exhibited by the register 103 and the comparison-discrimination circuit 105 in the embodiment shown in FIG. 1 are played by the signal 601 from the arithmetic unit 104. As a result, the overall construction of the address arithmetic unit can be simplified.

Figure 6B:
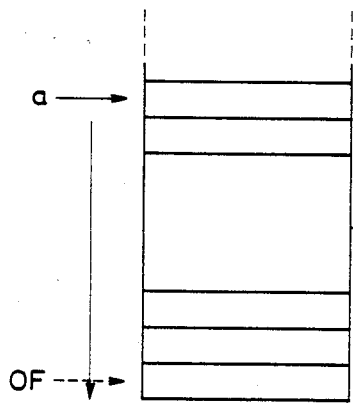
FIG. 6(b) is a structural view of a data memory when the address arithmetic unit shown in FIG. 6(a) executes an increment operation.
Figure 6C:
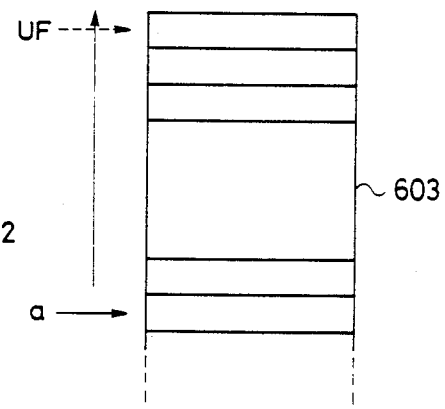
FIG. 6(c) is a structural view of the data memory when the address arithmetic unit executes a decrement operation.

FIG. 6(b) shows the addressing mode in which the access mode returns to the initial value address a when overflow (OF) occurs due to increment of the access address as described above. On the contrary, FIG. 6(c) shows the addressing mode in which the access address returns to the initial value address a when underflow (UF) occurs due to decrement of the access address In this case, too, the initial value address is set to a definite value other than zero. The final value address due to decrement becomes a signal whose bits from LSB to MOSB are all zero ("0") and the underflow carry signal as the return address is a binary signal of a bit lower by one bit than LSB of the access address. When underflow occurs, the underflow carry signal changes from "0" to "1".

Figure 7A:
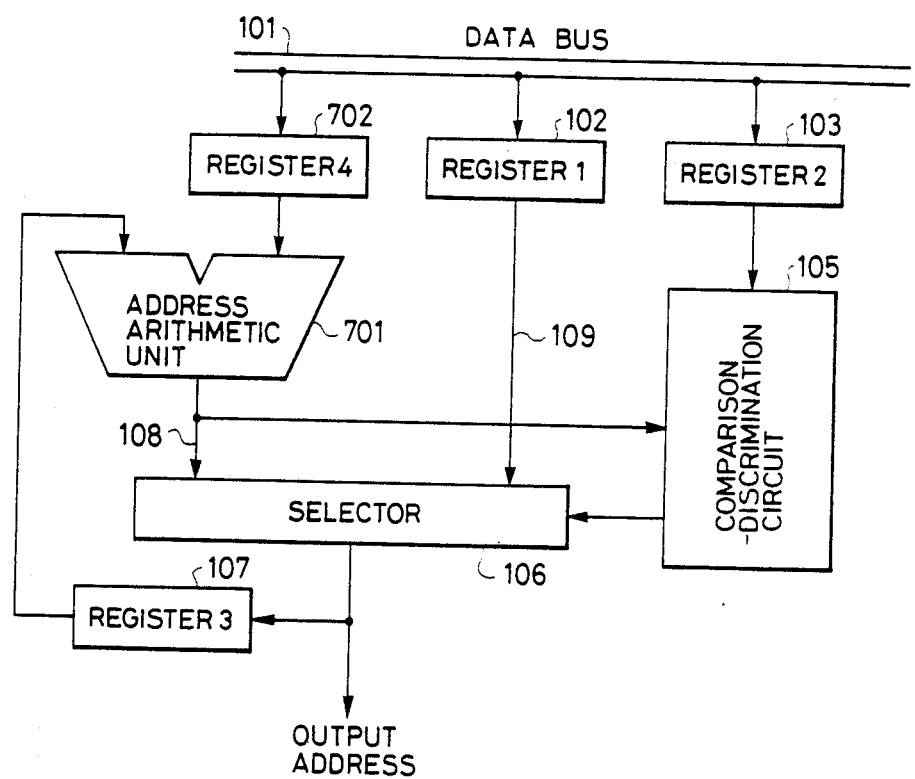
FIG. 7(a) is a block diagram of the address arithmetic unit in accordance with a third embodiment of the present invention.
Figure 7B:
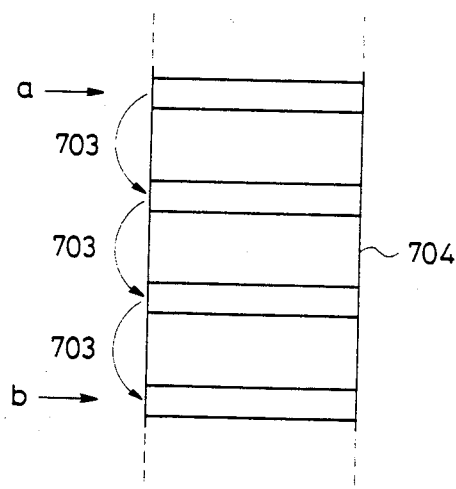
FIG. 7(b) is a structural view of the data memory when the address arithmetic unit shown in FIG. 7(a) executes the operation.

FIG. 7 shows the structure of the address arithmetic unit in accordance with the third embodiment of the present invention and the address disposition of its data memory. In FIG. 7(a), reference numeral 701 represents an arithmetic unit equipped with the increase/decrease functions of numbers greater than 1 in addition to the increment and decrement functions and reference numeral 702 represents a register for storing the number to be increased or decreased. In addition to the operational functions accomplished by the embodiment shown in FIG. 1, this embodiment can accomplish loop addressing of skip addresses of a predetermined number as shown in FIG. 7(b). Reference numeral 703 in FIG. 7(b) represents a value which corresponds to the content of the register 702 shown in FIG. 7(a). In other words, if a predetermined number such as x is set to the register 702, the a address is outputted as the initial value address and is then fed back and inputted to the arithmetic unit 701 through the register 107, where it is added to the content of the register 702. Accordingly, the next output is the value obtained by adding the value of 703 to the a address, and addressing to the skip addresses can be made to the final address b in the sequence shown in FIG. 7(b).

Figure 8:
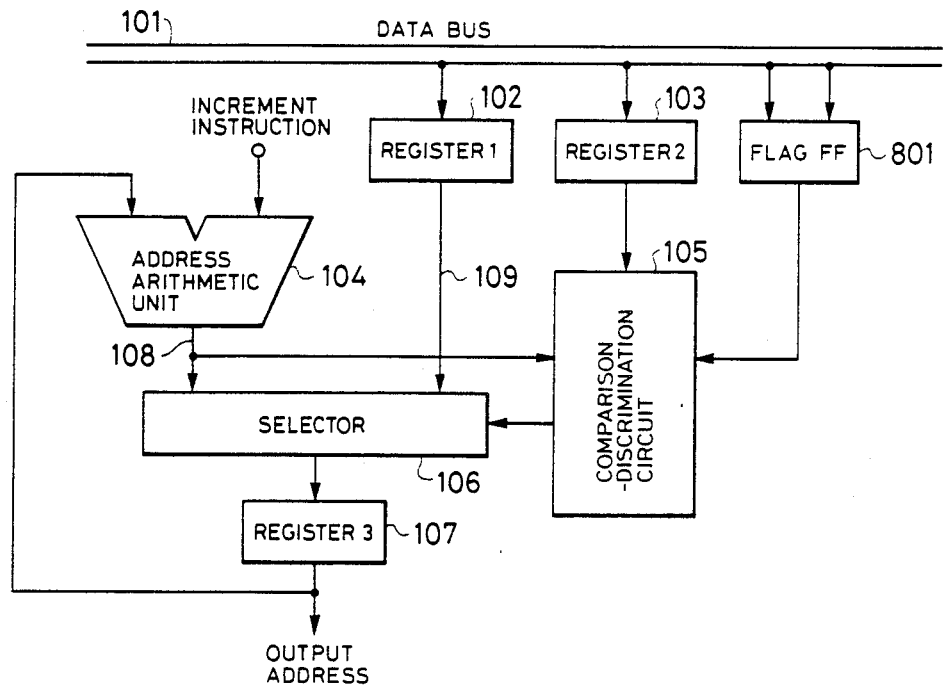
FIG. 8 is a block diagram of the address arithmetic unit in the fourth embodiment of the present invention.

FIG. 8 is a structural view of the address arithmetic unit in accordance with the fourth embodiment of the present invention. In FIG. 8, a flip-flop 801 for flag is merely added to the embodiment shown in FIG. 1 and the rest of the constructions are the same as those of FIG. 1. In other words, a flag set/reset instruction is disposed afresh, and the flag, its set instruction and its reset instruction will be hereinafter called the "mode flag MODF", "SMODA" and "RMODA", respectively. While the flip-flop 801 of flag MODF is set by the SMODA instruction, the initial value is automatically outputted as the result of calculation when it is in agreement with the upper or lower limit value which is set to the register 103. If the result of calculation does not yet reach the upper or lower limit value, the ordinary increment or decrement operation is carried out as such. When the flip-flop 801 is reset by the RMODF instruction, the addressing mode within a predetermined range is complete.

As described above, the addressing mode can be controlled arbitrarily by disposing the mode flag for starting/finishing the operation of the comparison/discrimination circuit 105 and the set/reset instruction for this flag.

The present invention is not limited, in particular, to the embodiments described above but can be changed or modified in various forms and manners.

For example, in the embodiment shown in FIG. 1, the final address and the return address for the access addresses can be obtained by decrementing the initial value address.

Furthermore, the present invention can be applied to a high speed microprocessor for executing repeatedly digital arithmetic calculation of the data which are read out repeatedly from a memory storing therein such data.

As described above, loop addressing can be made inside the address zone of a predetermined range without using conditional branch instruction in the present invention, so that the step number of a program can be reduced and through-put of signal processing can be improved. Moreover, since arbitrary initial value address, final value address and return address can be set, addressing having high versatility can be accomplished.

What is claimed is:

1. An information processing apparatus comprising:
   (1) memory means for storing a plurality of data from an initial value to a final value;
   (2) address generation means for generating an initial value address to a final value address so as to read out sequentially a plurality of said data from said initial value to said final value from said memory means;
   (3) first storage means for storing said initial value address generated from said address generation means;
   (4) second storage means for storing a return address exceeding said final value address generated from said address generation means; and
   (5) comparison means for receiving, at its first input, the address information from the output of said address generation means and receiving, at its second input, said return address from the output of said second storage means;

wherein when said return address is generated from said address generation means, said initial value address stored in said first storage means is outputted at the output of said address generation means in response to the output of said comparison means.

2. An information processing apparatus according to claim 1, wherein a plurality of said data from said initial value to said final value, stored in said memory means, are filtering coefficients constituting a digital filter.

3. An information processing apparatus according to claim 2, further comprising:
   (6) data calculation means for digitally calculating a digital input signal and said filtering coefficients read out from said memory means.

4. An information processing apparatus comprising:
   (1) memory means for storing a plurality of data from an initial value to a final value; and
   (2) address generation means for generating addresses from an initial value address to a final value address so as to read out sequentially a plurality of said data from said initial value to said final value from said memory means;

wherein said address generation means further generates a return address exceeding said final value address, said return address is defined by selected one of overflow and underflow of address information generated from the output of said address generation means, said initial value address is set to a definite value exclusive of zero, and when said return address is generated from the output of said address generation means, said initial value address is generated at the output of said address generation means in response to the result of detection of said selected one of overflow and underflow.

5. An information processing apparatus according to claim 4, further comprising:
   (3) storage means for storing said initial value address.

6. An information processing apparatus according to claim 5, wherein a plurality of said data from said initial value to said final value that are stored in said memory means are filtering coefficients for constituting a digital filter.

7. An information processing apparatus according to claim 6, further comprising:
   (4) data calculation means for digitally calculating a digital input signal and said filtering coefficients read out from said memory means.

* * * * *